(12) United States Patent
Kostiainen et al.

(10) Patent No.: US 9,756,036 B2
(45) Date of Patent: Sep. 5, 2017

(54) MECHANISMS FOR CERTIFICATE REVOCATION STATUS VERIFICATION ON CONSTRAINED DEVICES

(71) Applicant: Nokia Technologies Oy, Espoo (FI)

(72) Inventors: Kari Kostiainen, Helsinki (FI); Nadarajah Asokan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/910,613

(22) Filed: Jun. 5, 2013

(65) Prior Publication Data

US 2013/0340064 A1 Dec. 19, 2013

Related U.S. Application Data

(60) Provisional application No. 61/660,379, filed on Jun. 15, 2012.

(51) Int. Cl.
*H04L 29/06* (2006.01)
*H04L 9/08* (2006.01)
*H04L 9/32* (2006.01)

(52) U.S. Cl.
CPC ........ *H04L 63/0823* (2013.01); *H04L 9/0869* (2013.01); *H04L 9/3268* (2013.01); *H04L 9/3271* (2013.01)

(58) Field of Classification Search
CPC .................................................. H04L 63/0823
USPC ............................................ 726/10; 713/158
See application file for complete search history.

(56) References Cited

U.S. PATENT DOCUMENTS

| 7,743,248 B2 | 6/2010 | Bisbee et al. |
| 2005/0235150 A1* | 10/2005 | Kaler et al. ................... 713/168 |
| 2006/0161445 A1* | 7/2006 | Frank ...................... G06F 21/44 726/17 |
| 2007/0075834 A1* | 4/2007 | Armstrong et al. ......... 340/10.1 |
| 2008/0077976 A1* | 3/2008 | Schulz .............................. 726/5 |
| 2008/0133918 A1* | 6/2008 | You et al. ..................... 713/175 |
| 2008/0270790 A1* | 10/2008 | Brickell et al. ............... 713/158 |

(Continued)

OTHER PUBLICATIONS

Mauri, "Up-to-date key retrieval for information centric networking", Jan. 15, 2017, Computer Networks, p. 1-11.*

(Continued)

*Primary Examiner* — Taghi Arani
*Assistant Examiner* — Gregory Lane
(74) *Attorney, Agent, or Firm* — Alston & Bird LLP

(57) ABSTRACT

A process is provided for communication security certificate revocation status verification by using the client device as a proxy in online status verification protocol. The process utilizes a nonce of an authentication protocol request message (nonce_A) to derive the nonce for the revocation status protocol request (nonce_S) to reduce the number of message exchanges needed between the client and the verifier devices, and a mechanism to send the nonce (nonce_S) prior to actual authentication protocol execution to ease the connectivity requirement of client device from on-demand connectivity to periodic connectivity. Similar functionality is achieved using a random seed established between the verifier and client. The verifier picks a seed for random number generation and sends that seed to the client. The client derives the nonce_S from the seed before status protocol execution, and the verifier derives the nonce_S from the seed before proxied status response verification.

24 Claims, 11 Drawing Sheets

(56) References Cited

U.S. PATENT DOCUMENTS

| | | | | |
|---|---|---|---|---|
| 2008/0301793 | A1* | 12/2008 | Kim et al. | 726/10 |
| 2009/0063855 | A1* | 3/2009 | Parkinson | H04L 63/20 713/158 |
| 2010/0031031 | A1 | 2/2010 | Tian et al. | |
| 2010/0205431 | A1* | 8/2010 | Griffin | 713/158 |
| 2010/0238811 | A1* | 9/2010 | Rune | H04L 12/66 370/248 |
| 2010/0293370 | A1* | 11/2010 | Xiao | H04L 63/061 713/155 |
| 2011/0099367 | A1 | 4/2011 | Thom et al. | |
| 2011/0213968 | A1 | 9/2011 | Zhang et al. | |
| 2012/0128155 | A1* | 5/2012 | Effenberger | 380/256 |
| 2013/0326224 | A1* | 12/2013 | Yavuz | 713/176 |

OTHER PUBLICATIONS

Open Mobile Alliance, Online Certificate Status Protocol Mobile Profile (2007), 25 pages.
Deacon, A. et al., *RFC 5019: The Lightweight Online Certificate Status Protocol (OCSP) Profile for High-Volume Environments*, IETF (Sep. 2007), 22 pages.
Kondareddy, Y. et al., *Analysis of Certificate Revocation List Distribution Protocols for Vehicular Networks*, IEEE Globelcom (2010), 5 pages.
Laberteaux, K. et al., *Security Certificate Revocation List Distribution for VANET.ACM International workshop on Vehicular Internetworking* (VANET'08) (2008), 2 pages.
Marias et al., *ADOPT: A Distributed OSCP for Trust Establishment in MANETs*, European Wireless Conference (2005), 7 pages.
Munoz Tapia, J. L. et al., *CPC-OCSP: An Adaption of OCSP for m-commerce*. Upgrade, vol. 3, No. 6 (2002) 11 pages.
Papapanagiotou et al., *A Certificate Validation Protocol for VANETs*, IEEE Globecom Workshop (2007), 9 pages.
Papdimitratos, P. et al., *Certificate Revocation List Distribution in Vehicular Communication Systems*, ACM International workshop on Vehicular Internetworking (VANET'08) (2008), 10 pages.
Perkins, C. (Ed.) *RFC 5944: IP Mobility Support for IPv4, revised*, IETF, Nov. 2010, 100 pages.
International Search Report and Written Opinion from corresponding International Appl. No. PCT/FI2013/050631, mailed Oct. 9, 2013.
Supplementary European Search Report for Application No. EP 13 80 4935 dated Mar. 17, 2016.
Cooper, D. et al., *Internet x.509 Public Key Infrastructure Certificate Certificate Revocation List (CRL) Profile*, RFC 5280 (May 2008) 152 pages.
Kostiainen, K. et al., *Practical Property-Based Attestation on Mobile Devices*, Correct System Design, vol. 6740 (Jan. 1, 2011) 78-92.
Myers, M. et al., *x.509 Internet Public Key Infrastructure Online Certificate Status Protocol—OCSP*, RFC 2560 (Jun. 1999) 24 pages.
Myers, M., *Revocation: Options and Challenges*, In Proceeding of Financial Cryptography (1998) 7 pages.
Wohlmacher, P., *Digital Certificates: A Survey of Revocation Methods*, In Proceedings of ACM Multimedia (2000) 111-114.
Zheng, P., *Tradeoffs in Certificate Revocation Schemes*, ACM SIGCOMM Computer Communication Review. vol. 33, Issue, 2 (Apr. 2003) 103-112.
Office Action for corresponding Chinese Application No. 201380031409.3 dated Feb. 4, 2017.
Office Action for corresponding Chinese Application No. 201380031409.3 dated Jun. 7, 2017, 7 pages.

\* cited by examiner

MECHANISMS FOR CERTIFICATE REVOCATION STATUS VERIFICATION ON CONSTRAINED DEVICES

This application claims priority from U.S. Provisional Application 61/660,379 filed Jun. 15, 2012 which is incorporated herein in its entirety.

TECHNOLOGICAL FIELD

An example embodiment of the present invention is related to the field of communications security; in particular, the provision of security certificates to users of communication resources and verification protocols for authenticating said certificates.

BACKGROUND

Public key certificates are commonly used for authentication of principals, such as devices and users. A public key certificate binds a public part of an asymmetric key pair to an identifier of the certified principal. The certificate is issued by a trusted Certificate Authority (CA) that signs the certificate. The certificate also contains a certificate identifier, such as certificate serial number. Each certified principal should store the private part of the asymmetric key securely.

If the private key of any principal is compromised (e.g., extracted from the device by an attacker and published online), anyone can masquerade as the certified principal using the issued certificate and the compromised private key. Thus, in case of noticed key compromise, the corresponding certificate should be revoked and the corresponding revocation information should be distributed to the relevant parties. Two well-known mechanisms for certificate revocation exist.

First, the CA maintains and periodically publishes a Certificate Revocation List (CRL). Such lists are defined in common X.509 certificate standard [X509]. A CRL contains a list of certificate identifiers, typically certificate serial numbers that have been revoked by the CA. The CRL is typically signed by the CA that issued the revoked certificates, or by another trusted entity authorized by the CA. A CRL also contains a timestamp. Using this timestamp the CRL verifier can check that the CRL is sufficiently recent.

Second, a certificate verifier can query the revocation status of a certificate from an online service that is maintained by the CA, or another trusted entity authorized by the CA. The responses to such online queries are signed by the trusted authority. The Online Certificate Status Protocol (OCSP) is a standardized protocol for such online queries. The freshness of OCSP responses can be guaranteed in two ways: (a) an OCSP request can contain a random nonce that should be included with the signed OCSP response, or (b) the OCSP response can contain a timestamp similar to CRLs.

The above mentioned well-known mechanisms for handling certificate revocation assume that (a) the certificate verifier has online connectivity and/or (b) the verifier knows the current time in a reliable manner. Online connectivity is needed for fetching the latest CRL from an online directory and for checking the revocation status of the certificate with an online service. The current time is needed to determine that the timestamp in a CRL or in an OCSP response is sufficiently recent.

There are practical use cases in which the certificate verifier has no connectivity to infrastructure networks or has no access to a reliable source of the current time. As such, how is the certificate revocation status securely verified from such constrained devices in an efficient manner in the context of execution of an authentication protocol.

By way of an example, a system model is defined in the following way: assume that two entities are engaged in an authentication protocol: a client device wishes to authenticate itself towards a verifier. Assume that the verifier has no direct connectivity to infrastructure networks and possibly no access to a reliable source of time. The client device has constant or periodic network connectivity. In an authentication protocol run, the verifier sends an authentication request with a random nonce and the client device replies with an authentication response that contains a signature calculated over the nonce and other information relevant for this particular authentication protocol, and a certificate.

MirrorLink [ML-ARCH] is a system that enables integration of mobile device provided services and content to infotainment systems in cars. In the MirrorLink system, the car head-unit (verifier) needs to authenticate, or attest, that the mobile device (client) is manufactured by a compliant mobile device manufacturer and that the mobile device is running compliant MirrorLink software. The primary reasons why such verification is needed are driving safety and liability issues. In the MirrorLink system, this authentication is achieved with a straight-forward device attestation protocol (DAP) that follows the model outlined above using a certified device key issued by the mobile device manufacturer.

In some cases, mobile devices may have only periodic connectivity to infrastructure networks. A mobile device that is roaming in a foreign country is an example scenario: cellular connectivity might be blocked or unavailable but periodic WiFi access through hotspots is usually available. Therefore, even from mobile devices, it is not possible for applications to always expect connectivity on-demand. A typical car head-unit has no direct connectivity to infrastructure networks. A typical head-unit has no reliable source of time information either. In a typical head-unit, a malicious user could reset or modify the head-unit clock from the head-unit user interface. Also situations in which the car main battery runs out may cause the head-unit clock to be reset. Such head-unit clock modifications are a relevant attack vector in systems like MirrorLink because the owner of the car may have an incentive to try to circumvent the MirrorLink device attestation model, in order to use non-compliant mobile devices or services while driving.

Although the MirrorLink system is the primary use case addressed in this description, the problem is not limited to the MirrorLink system only. Instead, similar revocation problems exist in other systems in which the verifier device has no connectivity and no reliable clock.

As such, it remains an open question as to how to design an efficient certificate revocation/freshness checking scheme that can work from a verifier device (e.g., car head unit) with (a) no online connectivity of its own and (b) no reliable way to determine current time, by using the help of a client device (e.g., mobile phone) which itself may have periodic network connectivity but cannot always provide network connectivity on-demand.

BRIEF SUMMARY

In a first embodiment, a process comprises using a nonce of an authentication protocol request message to derive a nonce for a revocation status protocol request. The nonce of the authentication protocol request becomes an operator of a key derivation function to derive a secure nonce. The number of messages necessary to exchange between a verifier device and a client proxy device may be reduced to two for a single authentication protocol request.

In an alternative embodiment, a process comprises receiving a random nonce at a client device from a verifier device before authentication protocol execution; obtaining revocation status information using the random nonce in the client device when network connectivity is available, and executing the authentication protocol between the verifier device and the client device. The process further comprises starting a timer when the random nonce is sent to the client device.

In another embodiment, a process comprises receiving a random seed value at a client device from a verifier device, deriving at the client device a revocation status nonce for a revocation status protocol request, verifying an authentication protocol response with an authentication protocol nonce received from a verifier device, and verifying the revocation status response with the revocation status nonce. The process further comprises starting a timer when the seed for the revocation nonce is sent to the client device.

Another embodiment may take the form of an apparatus comprising at least a processor, and a memory associated with the processor having computer coded instructions therein with the computer instructions being configured to, when executed by the processor, cause the apparatus to use a nonce of an authentication protocol request message to derive a nonce for a revocation status protocol request. The nonce of the authentication protocol request becomes an operator of a key derivation function to derive a secure nonce. The number of messages necessary to exchange in an authentication protocol may be reduced to two for a single authentication protocol request.

An alternative embodiment may be an apparatus comprising at least a processor, and a memory associated with the processor having computer coded instructions therein, with the computer instructions being configured to, when executed by the processor, cause the apparatus to receive a random nonce at a client device before authentication protocol execution; obtain revocation status information using the random nonce in the client device when network connectivity is available, and execute the authentication protocol. The process further comprises starting a timer when the random nonce is sent to the client device.

A further embodiment may be an apparatus comprising at least a processor, and a memory associated with the processor having computer coded instructions therein with the computer instructions configured to, when executed by the processor, cause the apparatus to receive a random seed value at a client device, derive at the client device a revocation status nonce for a revocation status protocol request, verify an authentication protocol response with an authentication protocol nonce, and verify the revocation status response with the revocation status nonce.

In a further embodiment, a computer program product is provided that comprises a non-transitory computer readable medium having computer program instructions stored therein, said instructions when executed by a processor causing a mobile terminal to use a nonce of an authentication protocol request message to derive a nonce for a revocation status protocol request. The nonce of the authentication protocol request becomes an operator of a key derivation function to derive a secure nonce. The number of messages necessary to exchange in an authentication protocol may be reduced to two for a single authentication protocol request.

In another embodiment, a computer program product is provided that comprises a non-transitory computer readable medium having computer program instructions stored therein, said instructions when executed by a processor causing a mobile terminal to receive a random nonce at a client device before authentication protocol execution; obtain revocation status information using the random nonce in the client device when network connectivity is available, and execute the authentication protocol. The process further comprises starting a timer when the random nonce is sent to the client device.

Another embodiment may be a computer program product comprising a non-transitory computer readable medium having computer program instructions stored therein, said instructions when executed by a processor causing a mobile terminal to receive a random seed value at a client device, derive at the client device a revocation status nonce for a revocation status protocol request, verify an authentication protocol response with an authentication protocol nonce, and verify the revocation status response with the revocation status nonce.

In yet another embodiment, an apparatus is provided that includes means for using a nonce of an authentication protocol request message to derive a nonce for a revocation status protocol request. The nonce of the authentication protocol request becomes an operator of a key derivation function to derive a secure nonce. The number of messages necessary to exchange between a verifier device and a client proxy device may be reduced to two for a single authentication protocol request.

In another embodiment, an apparatus includes means for receiving a random nonce at a client device from a verifier device before authentication protocol execution; means for obtaining revocation status information using the random nonce in the client device when network connectivity is available, and means for executing the authentication protocol between the verifier device and the client device. The apparatus may further include means for starting a timer when the random nonce is sent to the client device.

In further embodiment, an apparatus includes means for receiving a random seed value at a client device from a verifier device, means for deriving at the client device a revocation status nonce for a revocation status protocol request, means for verifying an authentication protocol response with an authentication protocol nonce received from a verifier device, and means for verifying the revocation status response with the revocation status nonce. The apparatus may further include means for starting a timer when the seed for the revocation nonce is sent to the client device.

BRIEF DESCRIPTION OF THE SEVERAL VIEWS OF THE DRAWINGS

Figure 1:
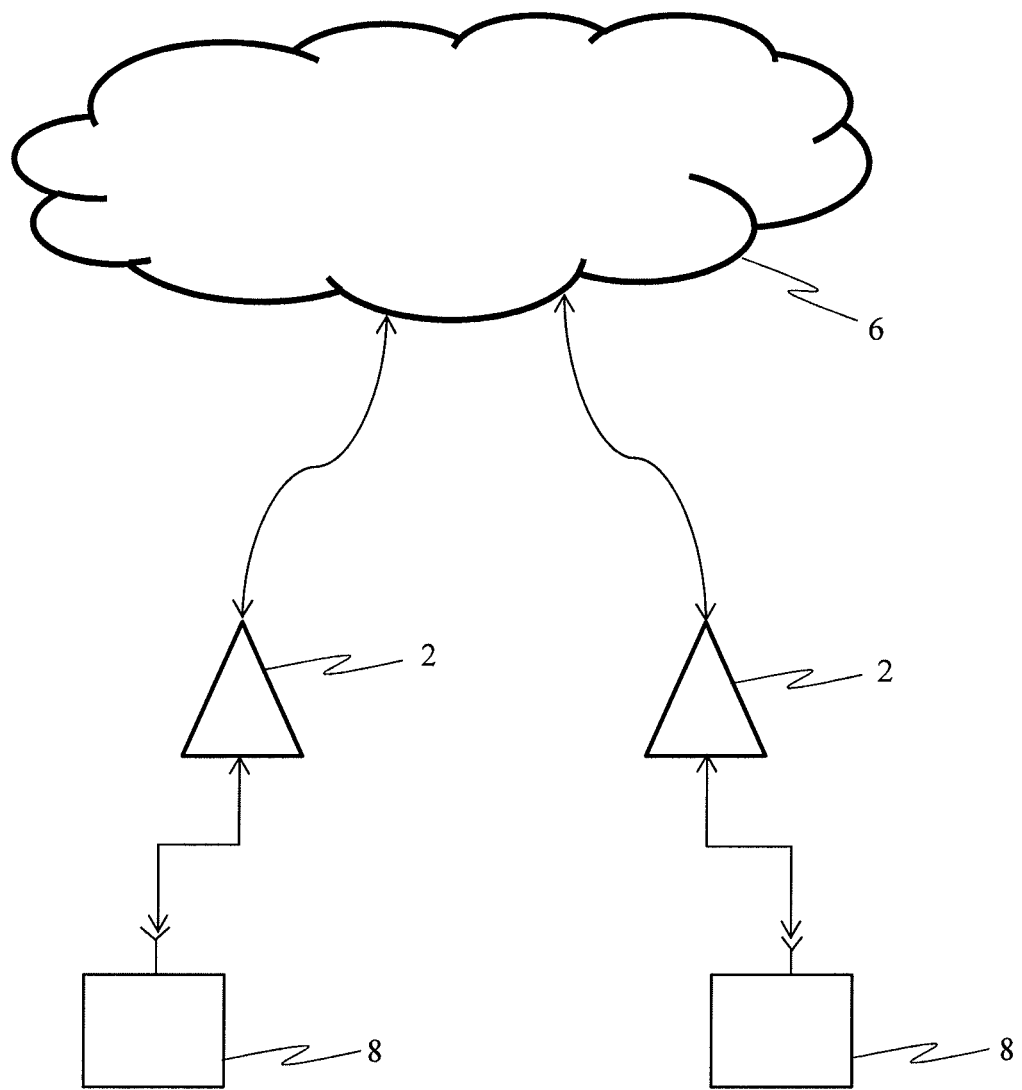
Figure 2:
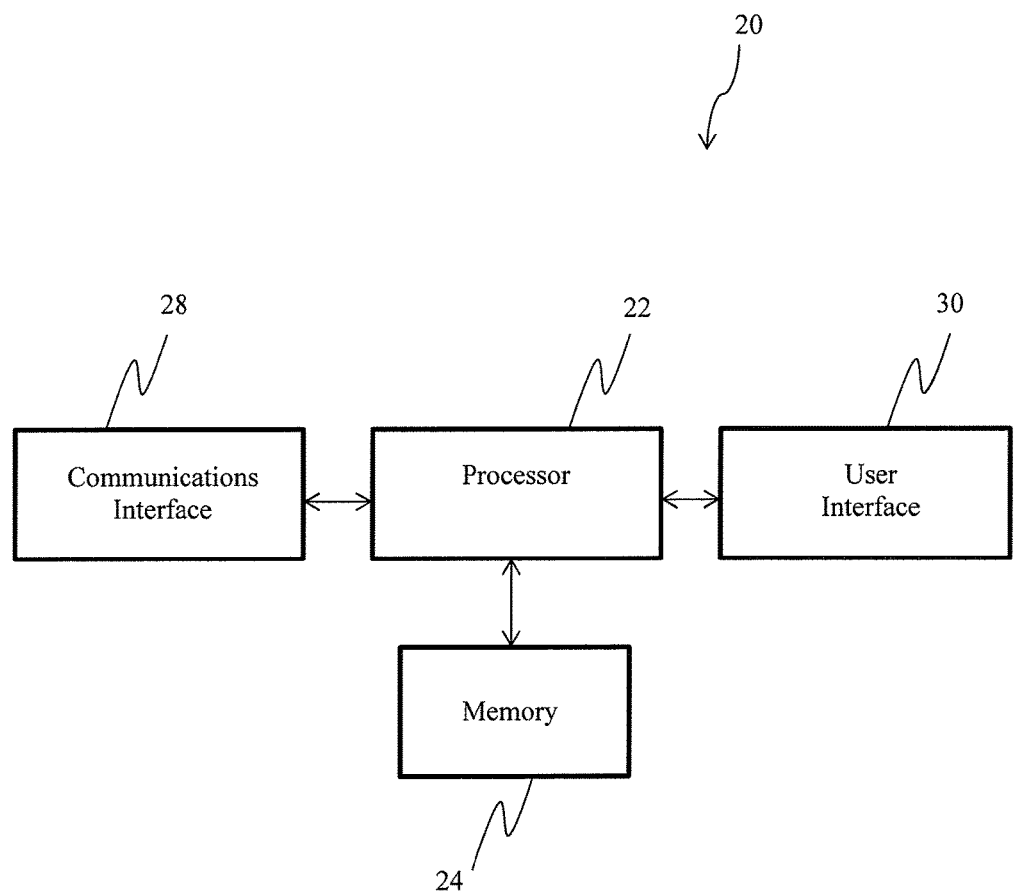
Figure 3:
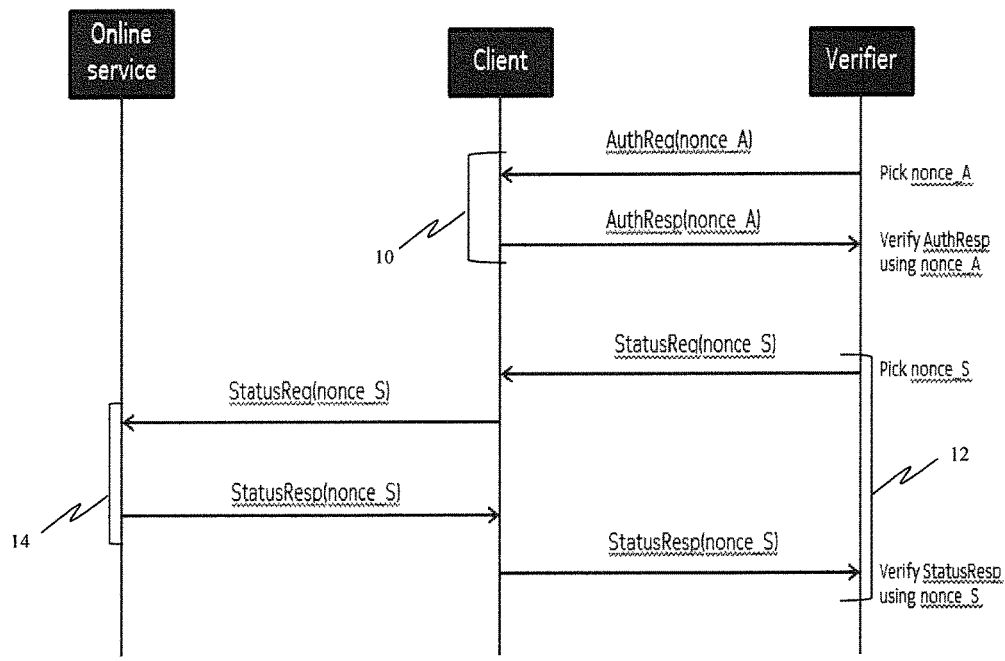
Figure 4:
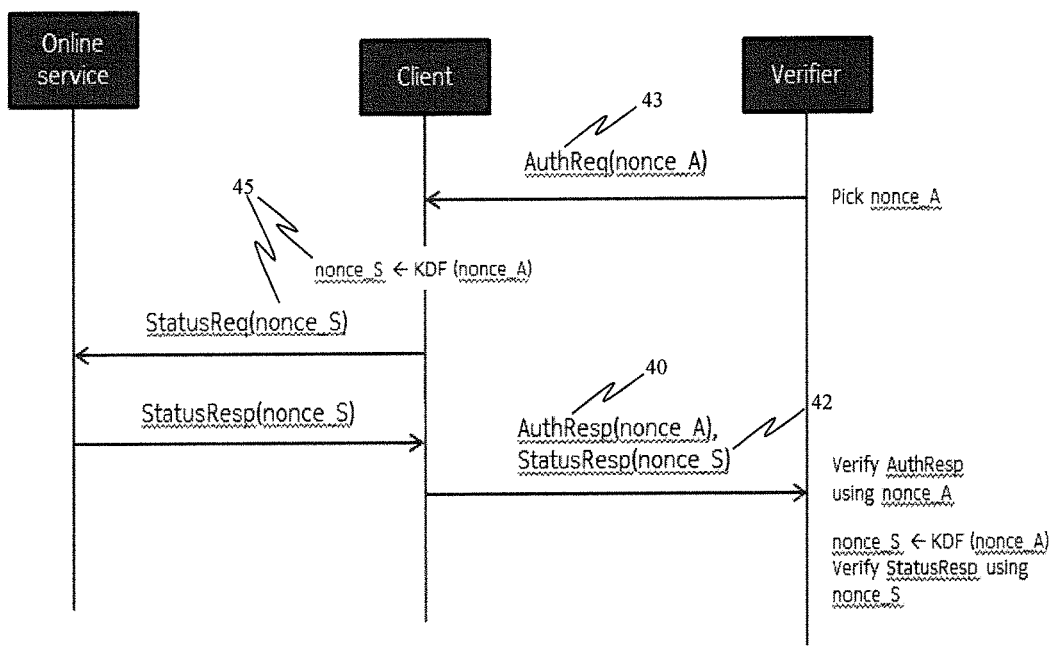
Figure 5:
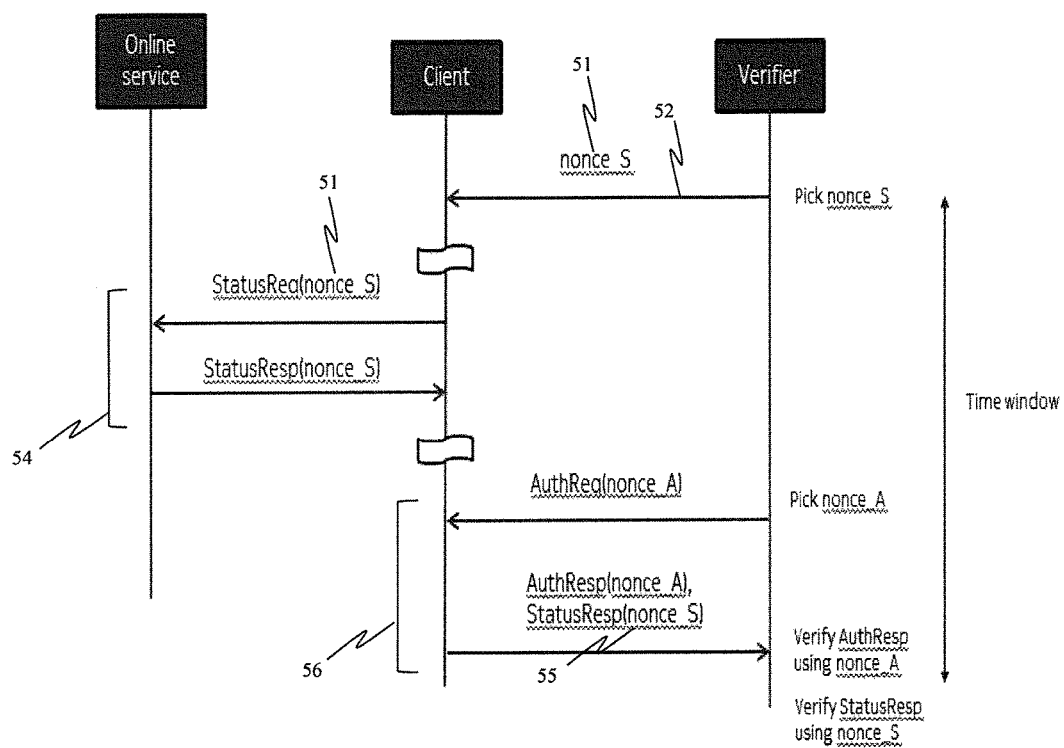
Figure 6:
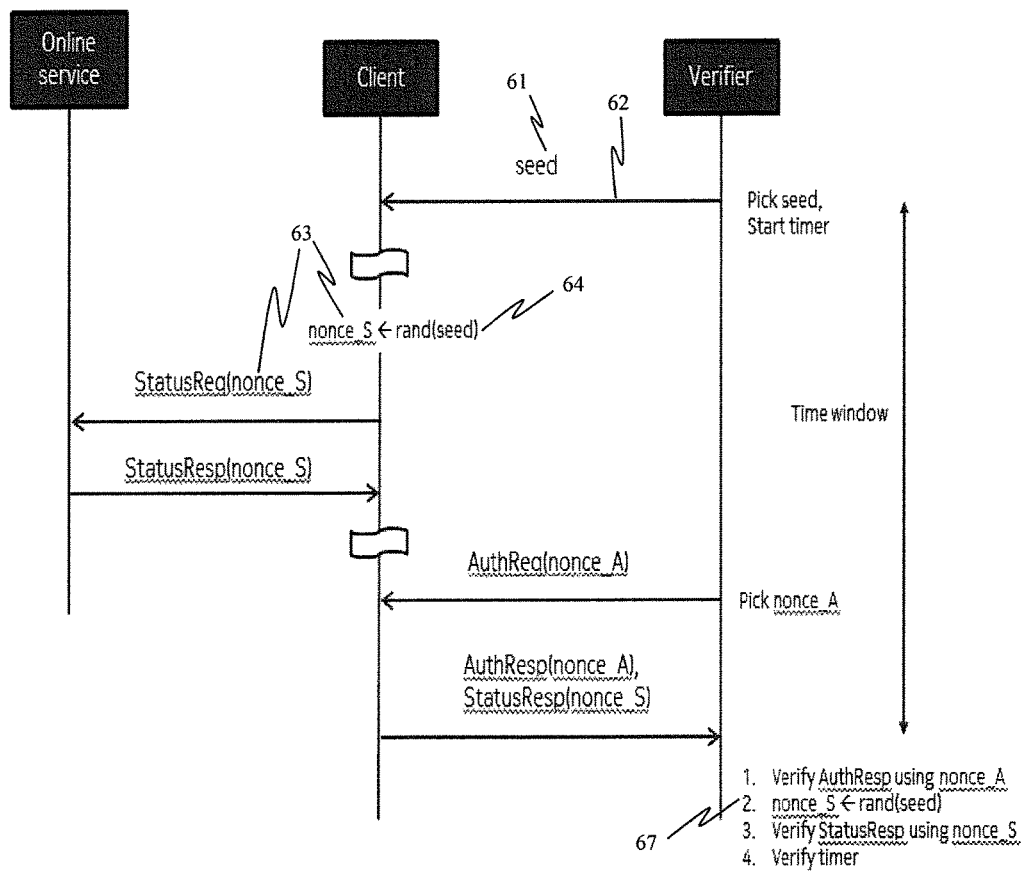
Figure 7:
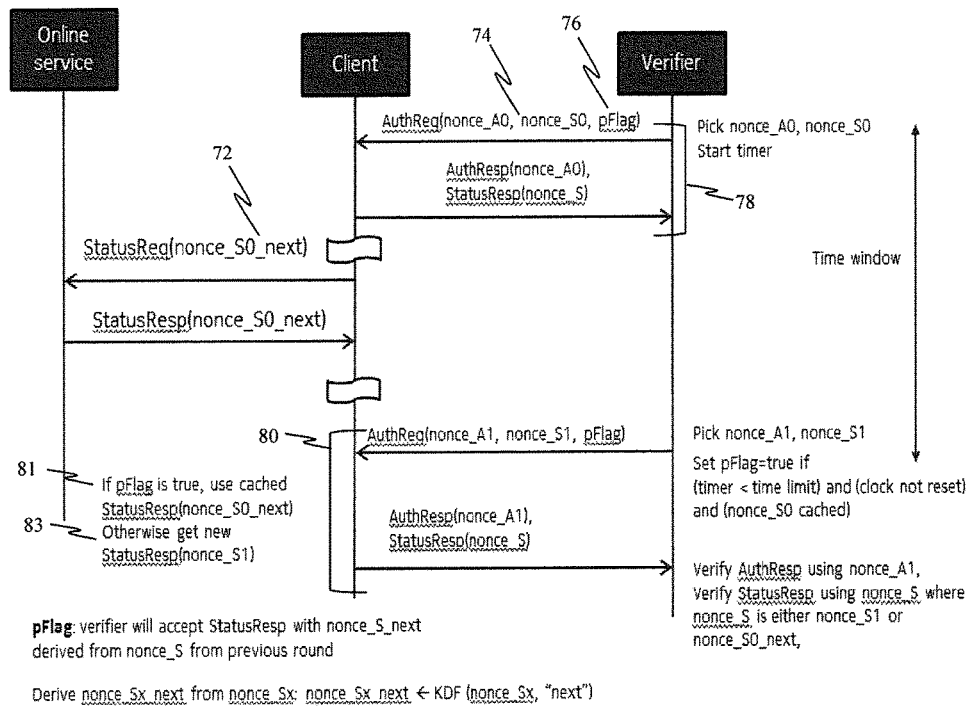
Figure 8:
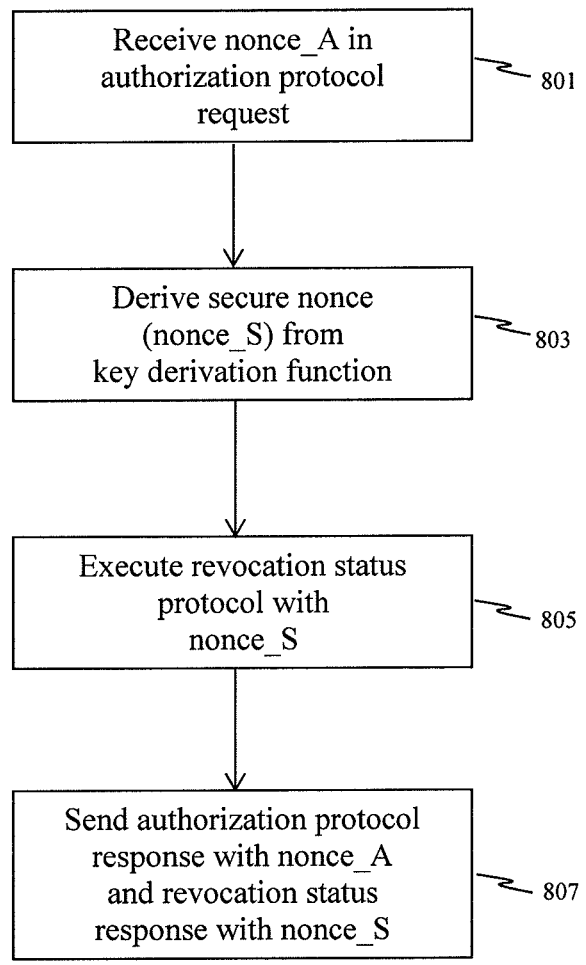
Figure 9:
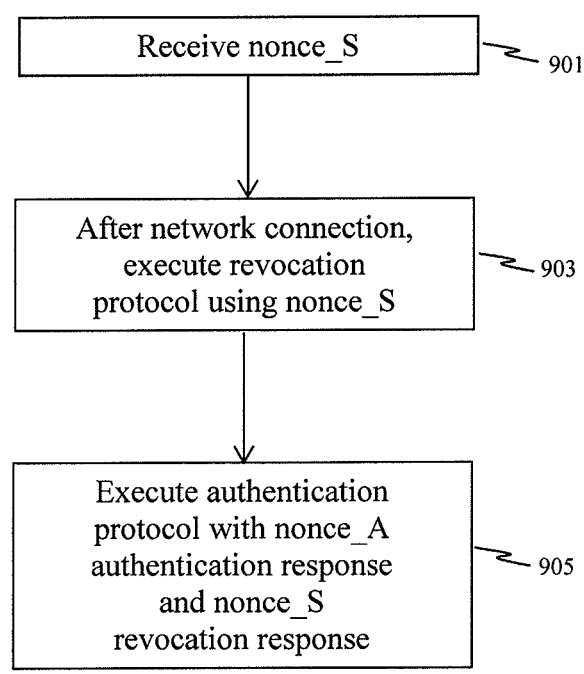
Figure 10:
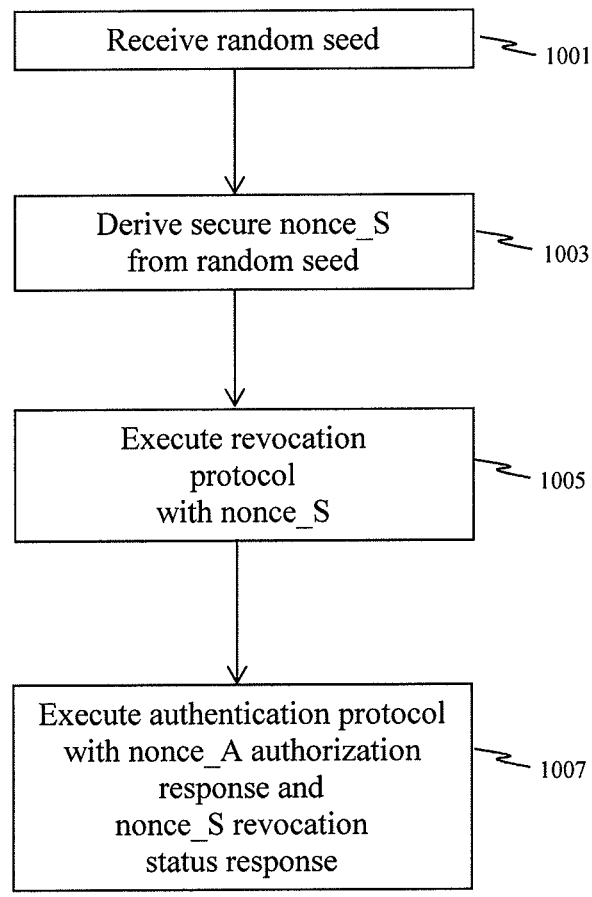
Figure 11:
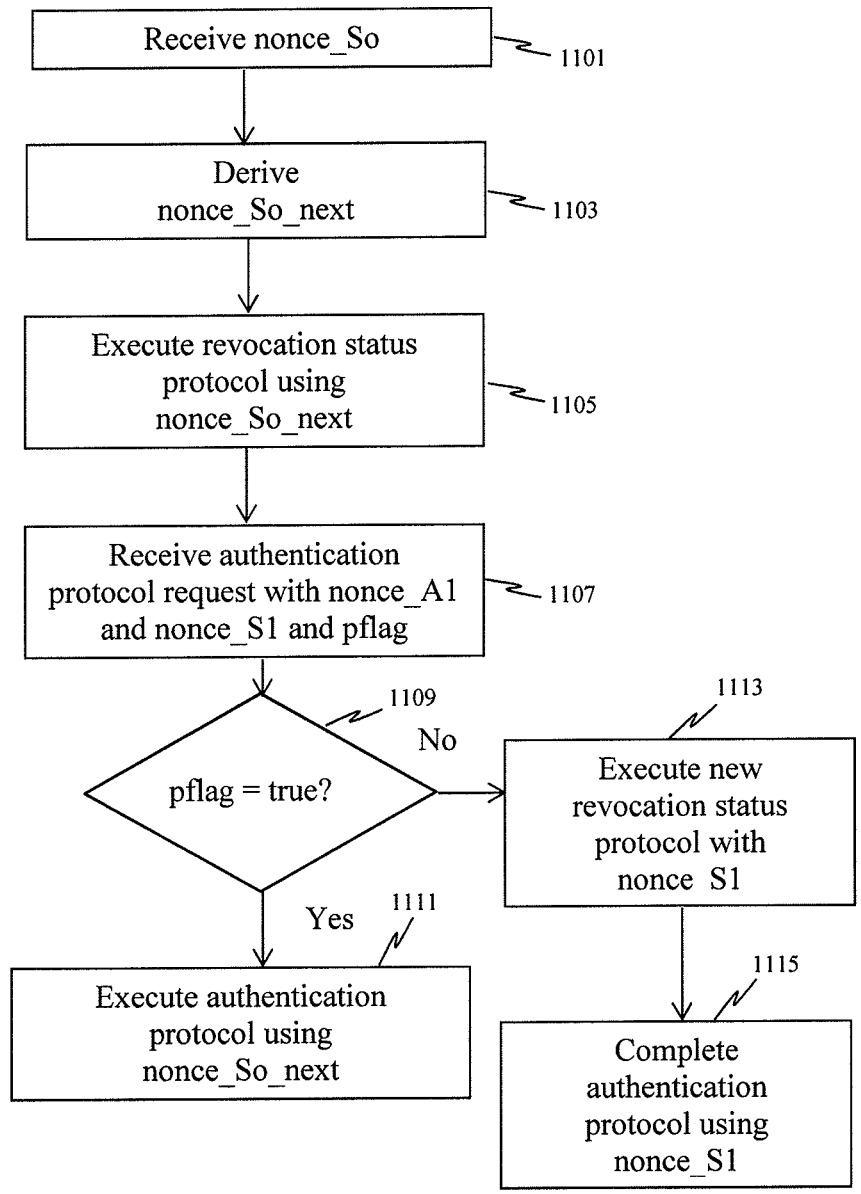

Having thus described certain embodiments of the invention in general terms, reference will now be made to the accompanying drawings, which are not necessarily drawn to scale, and wherein:

FIG. 1 is a schematic diagram of a wireless communications network;

FIG. 2 is a schematic diagram of a mobile terminal apparatus that may be specifically configured in accordance with an example embodiment of the present invention;

FIG. 3 is a signaling diagram illustrating client device mediation of revocation status request in accordance with an example embodiment of the present invention;

FIG. 4 is a signaling diagram illustrating optimized proxy verification in accordance with an example embodiment of the present invention;

FIG. 5 is a signaling diagram illustrating revocation status verification in accordance with an example embodiment of the present invention;

FIG. 6 is a signaling diagram illustrating an alternative revocation status verification in accordance with an example embodiment of the present invention;

FIG. 7 is a signaling diagram illustrating a generalized, implementation of one embodiment of the invention;

FIG. 8 is a flow diagram of a first embodiment of a method for certificate verification;

FIG. 9 is a flow diagram of a second embodiment of a method for certificate verification;

FIG. 10 is a flow diagram of a third embodiment of a method for certificate verification; and FIG. 11 is a flow diagram of a fourth embodiment of a method for certificate verification.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Although the method, apparatus and computer program product of example embodiments of the present invention may be implemented in a variety of different systems, one example of such a system is shown in FIG. 1, which includes a mobile terminal 8 that is capable of communication with a network 6 (e.g., a core network) via, for example, an radio network controller (RNC) 2. While the network may be configured in accordance with a Universal Mobile Telecommunications System (UMTS) Terrestrial Radio Access Network (UTRAN), the network may employ other mobile access mechanisms such as Long Term Evolution (LTE), LTE-Advanced (LTE-A), wideband code division multiple access (W-CDMA), CDMA2000, global system for mobile communications (GSM), general packet radio service (GPRS) and/or the like.

The network 6 may include a collection of various different nodes, devices or functions that may be in communication with each other via corresponding wired and/or wireless interfaces. For example, the network may include one or more base stations, such as one or more node Bs, evolved node Bs (eNBs), access points, relay nodes or the like, each of which may serve a coverage area divided into one or more cells. For example, the network may include one or more cells, including, for example, the RNC 2, each of which may serve a respective coverage area. The serving cell could be, for example, part of one or more cellular or mobile networks or public land mobile networks (PLMNs). In turn, other devices such as processing devices (e.g., personal computers, server computers or the like) may be coupled to the mobile terminal and/or the second communication device via the network.

The mobile terminal 8 may be in communication with each other or other devices via the network 6. In some cases, each of the mobile terminals may include an antenna or antennas for transmitting signals to and for receiving signals from a base station. In some example embodiments, the mobile terminal 8, also known as a client device, may be a mobile communication device such as, for example, a mobile telephone, portable digital assistant (PDA), pager, laptop computer, tablet computer, or any of numerous other hand held or portable communication devices, computation devices, content generation devices, content consumption devices, universal serial bus (USB) dongles, data cards or combinations thereof. As such, the mobile terminal 8 may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal 8 may also include communication circuitry and corresponding hardware/software to enable communication with other devices and/or the network 14.

Referring now to FIG. 2, an apparatus 20 that may be embodied by or otherwise associated with a mobile terminal 8 device (e.g., a cellular phone, a personal digital assistant (PDA), smartphone, tablet computer or the like) or a verifier device as discussed below may include or otherwise be in communication with a processor 22, a memory device 24, a communication interface 28, and a user interface 30.

In some example embodiments, the processor 22 (and/or co-processors or any other processing circuitry assisting or otherwise associated with the processor) may be in communication with the memory device 24 via a bus for passing information among components of the apparatus 20. The memory device 24 may include, for example, one or more non-transitory volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device 24 could be configured to store instructions for execution by the processor 22.

The apparatus 20 may, in some embodiments, be embodied by a mobile terminal 8. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a mobile terminal 8, the processor may be embodied by the processor of the mobile terminal 8.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 28 may be any means such as a device or circuitry embodied in either hardware or a combination of hardware and software that is configured to receive and/or transmit data from/to a network and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In order to support multiple active connections simultaneously, such as in conjunction with a digital super directional array (DSDA) device, the communications interface of one embodiment may include a plurality of cellular radios, such as a plurality of radio front ends and a plurality of base band chains. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus 20 is embodied by a mobile terminal 8, the apparatus may include a user interface 30 that may, in turn, be in communication with the processor 22 to receive an indication of a user input and/or to cause provision of an audible, visual, mechanical or other output to the user. As such, the user interface may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device and/or the like).

In regards to optimization to proxy verification, one technique to achieve certificate revocation status verification is to let the client device (also referenced as a client), such as a mobile terminal 8, act as a proxy in online status verification protocol. This approach is illustrated in FIG. 3. The normal authentication protocol 10 is executed first and the verifier device (also referenced as a verifier), such as processor 22 of the verifier device, then extracts the client certificate from the authentication protocol response and runs an online verification status check 12 for this certificate mediated, or proxied, by the client device, such as the processor 22 or communications interface 28 of the client device, that has network connectivity 14. In both the authentication protocol 10 and the revocation status protocol 12, the freshness of response messages is guaranteed by including a random nonce (picked by the verifier). This mechanism has two major limitations: First, the client device needs immediate, on-demand connectivity at the time of authentication protocol run. Second, two complete message round-trips between client device and verifier are needed.

A first embodiment of an improved process is a mechanism to integrate the execution of the authentication protocol to the execution of the certificate verification status protocol in a manner that reduces the number of messages that needs to be exchanged between the client device and the verifier. This process uses the nonce of the authentication protocol request message 43 (nonce_A) to derive the nonce for the revocation status protocol request 45 (nonce_S). This approach is illustrated in FIG. 4, in which KDF( ) stands for key derivation function. This optimization guarantees freshness of both authentication protocol response 40 and revocation status response 42 and decreases the number of messages that need to be sent between the verifier device and the client device. However, this optimized version still retains the main limitation of the basic mechanism: the client device must have on-demand connectivity at the time of the authentication protocol run.

A second embodiment provides an improved verification process protocol without on-demand connectivity. The second embodiment is a way of combining an authentication protocol with a certificate revocation status protocol in a way that the client device needs only periodic network connectivity. The basic idea of this approach is illustrated in FIG. 5. In this process, the verifier device, such as the processor 22 of the verifier device, picks a random nonce 51 (nonce_S) and sends it 52 to the client device before authentication protocol execution. At any later point in time, when the client device has infrastructure network connectivity, the client device, such as the processor 22 or the communication interface 28 of the client device, may fetch the latest revocation status information 54 using this nonce 51 in the status verification protocol request. Later, the authentication protocol 56 can be executed between the verifier device and the client device without immediate, on-demand online connectivity.

Upon receiving authentication protocol response and revocation status protocol response, the verifier device, such as the processor 22 of the verifier device, checks that nonce_S is sufficiently recent. The verifier device, such as the processor 22 of the verifier device, therefore starts a timer when nonce_S is sent to the client 52. Thus, the verifier is able to run a timer as long as it powered, but a persistent reliable clock that resists power breaks and user manipulation is not required. This would be the case with many car head-units, for example. The maximum allowable time window 58 between nonce_S generation and status response verification 55 depends on the use case at hand.

Alternatively, in another embodiment, similar functionality can be achieved by using a random seed that is established between the verifier and the client. This approach is illustrated in FIG. 6. The verifier, such as the processor 22 of the verifier device, can pick a seed 61 for random number generation and send that seed 62 to the client. The client, such as the processor 22 of the client device, can derive 64 the needed nonce_S 63 from the seed before status protocol execution, and the verifier, such as the processor 22 of the verifier device, can derive 67 the same nonce_S from the same seed before proxied status response verification.

To summarize, example embodiments may provide a mechanism to utilize a nonce of an authentication protocol request message (nonce_A) to derive the nonce for the revocation status protocol request (nonce_S) to reduce the number of message exchanges needed between the client and the verifier devices, and a mechanism to send the needed nonce (nonce_S) prior to actual authentication protocol execution to ease the connectivity requirement of client device from on-demand connectivity to periodic connectivity.

A more detailed and generalized description of the identification process is given in FIG. 7. For each authentication protocol run, it is not necessary to send a previous separate nonce message, as is done in FIG. 5. Instead, the needed status protocol nonce (nonce_Sx_next) 72 can be derived from a nonce that is included in a previous authentication protocol request (nonce_Sx) 74. The authentication protocol request message can also contain a flag 76 (pflag) that defines whether a cached status response 81 can be used, or whether a new status response should be obtained 83 using the nonce that is included with this authentication request.

For the first authentication protocol run 78 between the verifier and the client device there is no previous nonce, and thus this flag should be set to false. The flag should be set to false also if too much time has elapsed since the previous nonce was sent, or if the verifier device clock has been reset since the previous nonce was sent. Otherwise, the flag may be set to true provided that the timer is running and has not expired and there is a cached StatusResp(nonce_S_next) for use in the verifier status exchange.

In one practical embodiment, the authentication protocol could be MirrorLink device attestation protocol (DAP) and the revocation status protocol would be OCSP. Thus the authentication request (AuthReq) message could take the format of AttestationRequest from [ML-DAP] and the authentication response (AuthRes) could take the format of AttestationResponse from [ML-DAP]. The AttestationRequest message format facilitates one nonce. In a generic embodiment (FIG. 7) the AuthReq message should contain two nonces and a flag. In such an implementation, the current AttestationRequest message format should be extended for the extra nonce and the flag.

In similar manner, the revocation status request (StatusReq) could be OCSPRequest with id-pkix-ocsp-nonce extension used for the nonce as specified in [OCSP]. The revocation status response (StatusResp) could be OCSPResponse as specified in [OCSP]. No changes to OCSP protocol or message formats would be needed.

In this regard, a first embodiment provides an optimized version of proxied revocation status verification. On-demand connectivity from the client is needed.

Additionally or alternatively, a second embodiment provides proxied revocation status verification in which only periodic connectivity from the client device is needed. This mechanism requires one extra message (sending nonce_S or seed prior to authentication protocol run). Otherwise, no changes to existing protocols are needed. The generalized format shows how a nonce can be derived from previous message exchange (and thus no extra messages are needed). This generalized mechanism typically would require updates to authentication protocol request message formats (such as AttestationRequest in MirrorLink DAP).

Referring to the flow diagrams of the various embodiments of the methods of certificate revocation verification described herein, FIG. 8 is a flow diagram of a first embodiment of the method. The client device receives nonce_A 801 in the authentication protocol request signal. The client device then derives a secure nonce_S 803 using the key derivation function. The revocation status protocol is executed 805 over a network connection using nonce_S as the secure token. Finally, the client device sends the authorization protocol response 807 with nonce_A (from the verifier) and nonce_S in the response.

Referring to FIG. 9 an alternative embodiment is illustrated. The client device receives nonce_S 901 directly from the verifier. Once the client device establishes a network connection it executes the revocation protocol using nonce_S 903. Then it executes the authentication protocol 905 with nonce_A in the authentication response and nonce_S in the revocation response.

FIG. 10 illustrates another embodiment of the method. In this embodiment the process starts with the client device receiving a random seed 1001 from the verifier. The client device derives a secure nonce_S 1003 from the random seed. Then the revocation protocol is executed 1005 using nonce_S whenever there is network connectivity in the client device. Once the revocation protocol has been executed, the authentication protocol can follow with nonce_A in the authentication response 1007 and nonce_S in the revocation status response.

FIG. 11 shows yet another embodiment of the method. The client device receives nonce_So 1101 from the verifier, which starts a timer at that point. Then the client derives nonce_So_next 1103. The revocation status protocol is executed 1105 using nonce_So_next as the token. When an authentication protocol request is received 1107, a flag is checked for true/false condition 1109. The flag is true if the timer has not expired and provided there is a cached value of nonce_So_next. If so, the authentication protocol is completed 1111 using nonce_So_next as the token exchanged. If the flag was false, a new revocation status protocol would be executed 1113 with nonce_S1 (received in the authentication request) and the authentication request completed 1115 with nonce_S1 in the exchange.

The following abbreviations appear in the above description and may be found in the claims.

CA certificate authority
CCC Car Connectivity Consortium
CRL certificate revocation list
DAP Device Attestation Protocol (for MirrorLink)
ML MirrorLink
OCSP Online Certificate Status Protocol
X.509 certificate standard As described above, FIGS. 8-10 are flowcharts of a method, apparatus and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart blocks. These computer program instructions may also be stored in a non-transitory computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 8-10, when executed, convert a computer or processing circuitry into a particular machine configured to perform an example embodiment of the present invention. Accordingly, the operations of FIGS. 8-10 define an algorithm for configuring a computer or processing circuitry (e.g., processor) to perform an example embodiment. In some cases, a general purpose computer may be configured to perform the functions shown in FIGS. 8-10 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:
1. A method comprising:
receiving a nonce as at least a portion of an authentication protocol request message;
determining, using a processor, whether a new revocation status response is to be obtained based on at least the portion of the authentication protocol request message;
deriving, using the processor, a secure nonce for a revocation status protocol request using the nonce from the authentication protocol request as an operator of a key derivation function;
determining, using the processor, whether a cached status response is usable:
upon determination that the cached status response is usable, providing an authentication protocol response comprising the nonce and the secure nonce, wherein the authentication protocol response is configured for verification based on the nonce; and
generating, using the processor, a revocation status response that is configured for verification based on the secure nonce, and upon determination that the cached status response is not usable, executing the new revocation status response that is configured for verification based on a second secure nonce.

2. The method of claim 1 further comprising:
receiving a revocation status protocol response.

3. The method of claim 2 further comprising:
verifying the revocation status protocol response using the secure nonce.

4. The method of claim 1 wherein only two messages are necessary to exchange in an authentication protocol for a single authentication protocol request.

5. A method comprising:
receiving a random nonce at a client device before authentication protocol execution;
determining, using a processor, whether a new revocation status response is to be obtained based on at least a portion of an authentication protocol request message cached status response is usable:
obtaining revocation status information using the random nonce in the client device when network connectivity is available;
determining, using the processor, whether a cached status response is usable:
upon determination that the cached status response is usable, executing the authentication protocol with the processor, wherein the authentication protocol response is verified based on the nonce; and
generating, using the processor, a revocation status response corresponding to the revocation status information that is configured for verification based on the secure nonce, and
upon determination that the cached status response is not usable, executing the new revocation status response that is configured for verification based on a second secure nonce.

6. The method of claim 5 wherein executing the authentication protocol further comprises:
receiving an authentication protocol request having an authentication nonce.

7. The method of claim 6 wherein executing the authentication protocol further comprises:
returning the authentication nonce and the random nonce for authentication.

8. The method of claim 5 further comprising:
starting a timer when the random nonce is sent to the client device.

9. The method of claim 8 wherein the authentication protocol is executed only if the timer has not expired.

10. A method comprising:
receiving a random seed value at a client device from a verifier device; deriving at the client device a revocation status nonce for a revocation status protocol request;
determining, using a processor, whether a new revocation status response is to be obtained based on at least a portion of the revocation status protocol request;
determining, using the processor, whether a cached status response is usable: upon determination that the cached status response is usable, verifying, using the processor, an authentication protocol response with an authentication protocol nonce; and
verifying, using the processor, a revocation status response with the revocation status nonce, wherein the revocation status nonce is configured for a second derivation, via the verifier device, according to the random seed value prior to proxied status response verification, and upon determination that the cached status response is not usable, executing the new revocation status response that is configured for verification based on a second secure nonce.

11. The method of claim 10, further comprising:
starting a timer when the seed value for the revocation status nonce is sent to the client device.

12. The method of claim 11 wherein the authentication protocol is executed only if the timer has not expired.

13. An apparatus comprising a processor, and a memory in communication with the processor and having computer coded instructions stored therein, said instructions configured, when executed by the processor, to cause the apparatus to perform:
receiving a nonce as at least a portion of an authentication protocol request message;
determining, using the processor, whether a new revocation status response is to be obtained based on at least the portion of the authentication protocol request message;
deriving, using the processor, a secure nonce for a revocation status protocol request using the nonce from the authentication protocol request as an operator of a key derivation function;
determining, using the processor, whether a cached status response is usable: upon determination that the cached status response is usable, providing an authentication protocol response comprising the nonce and the secure nonce, wherein the authentication protocol response is configured for verification based on the nonce; and
generating, using the processor, a revocation status response that is configured for verification based on the secure nonce, and
upon determination that the cached status response is not usable, executing the new revocation status response that is configured for verification based on a second secure nonce.

14. The apparatus of claim 13, further comprising instructions configured to cause the apparatus to perform:
receiving a revocation status protocol response.

15. The apparatus of claim 14, further comprising instructions configured to cause the apparatus to perform:
verifying the revocation status protocol response using the secure nonce.

16. The apparatus of claim 13 wherein only two messages are necessary to exchange in an authentication protocol for a single authentication protocol request.

17. An apparatus comprising a processor, and a memory in communication with the processor and having computer coded instructions stored therein, said instructions configured, when executed by the processor, to cause the apparatus to perform:
receiving a random nonce at a client device before authentication protocol execution;
determining, using the processor, whether a new revocation status response is to be obtained based on at least a portion of an authentication protocol request message;
obtaining revocation status information using the random nonce in the client device when network connectivity is available;
determining, using the processor, whether a cached status response is usable: upon determination that the cached status response is usable, executing the authentication protocol, wherein the authentication protocol response is verified based on the nonce; and generating, using the processor, a revocation status response corresponding to the revocation status information that is configured for verification based on the secure nonce, and upon determination that the cached status response is not usable, executing the new revocation status response that is configured for verification based on a second secure nonce.

18. The apparatus of claim 17 wherein executing the authentication protocol comprises:
   receiving an authentication protocol request having an authentication nonce.

19. The apparatus of claim 18 wherein executing the authentication protocol further comprises:
   returning the authentication nonce and the random nonce for authentication.

20. The apparatus of claim 17, further comprising instructions configured to cause the apparatus to perform:
   starting a timer when the random nonce is sent to the client device.

21. The apparatus of claim 17 wherein the authentication protocol is executed only if the timer has not expired.

22. An apparatus comprising a processor, and a memory in communication with the processor and having computer coded instructions stored therein, said instructions configured, when executed by the processor, to cause the apparatus to perform:
   receiving a random seed value at a client device from a verifier device;
   deriving at the client device a revocation status nonce for a revocation status protocol request;
   determining, using the processor, whether a new revocation status response should be obtained based on at least a portion of the revocation status protocol request;
   determining, using the processor, whether a cached status response is usable;
   upon determination that the cached status response is usable, verifying, using the processor, an authentication protocol response with an authentication protocol nonce;
   verifying, using the processor, the revocation status response with the revocation status nonce, wherein the revocation status nonce is configured for a second derivation, via the verifier device, according to the random seed value prior to proxied status response verification, and
   upon determination that the cached status response is not usable, executing the new revocation status response that is configured for verification based on a second secure nonce.

23. The apparatus of claim 22 wherein executing the authentication protocol further comprises:
   starting a timer when the seed value for the revocation status nonce is sent to the client device.

24. The apparatus of claim 23 wherein the authentication protocol is executed only if the timer has not expired.

* * * * *